(12) United States Patent
Wade

(10) Patent No.: US 6,217,311 B1
(45) Date of Patent: Apr. 17, 2001

(54) APPARATUS FOR AND METHOD OF PORTIONING RICE

(75) Inventor: Colin Maxwell Wade, Bury St Edmunds (GB)

(73) Assignee: Sushi Express Co. Limited, Cambridge (GB)

(*) Notice: Subject to any disclaimer, the term of this patent is extended or adjusted under 35 U.S.C. 154(b) by 0 days.

(21) Appl. No.: 09/441,838

(22) Filed: Nov. 17, 1999

(30) Foreign Application Priority Data

Dec. 1, 1998 (GB) .................................................. 9826240

(51) Int. Cl.[7] .............................. A23P 1/00; B29C 43/00
(52) U.S. Cl. ................. 425/436 R; 99/439; 425/258; 425/422; 425/443; 425/444; 426/512
(58) Field of Search ........................... 426/512, 516; 425/426 R, 444, 443, 422, 256, 258; 99/353, 441, 442, 439

(56) References Cited

U.S. PATENT DOCUMENTS

| | | | |
|---|---|---|---|
| 907,382 | * | 12/1908 | Lenning . |
| 1,960,548 | * | 5/1934 | Pfeiffer . |
| 2,336,982 | * | 12/1943 | Cremer . |
| 2,666,400 | * | 1/1954 | Vogt . |
| 3,398,781 | * | 8/1968 | Blevis . |
| 3,726,625 | * | 4/1973 | Rees ....................................... 425/247 |
| 3,807,915 | * | 4/1974 | Rees ................................. 425/463 R |
| 4,043,728 | * | 8/1977 | Holly ..................................... 425/256 |
| 4,118,169 | * | 10/1978 | Haluska ................................ 425/583 |
| 4,139,593 | * | 2/1979 | Holz et al. ............................ 425/262 |
| 4,233,710 | * | 11/1980 | Wagner ................................. 425/205 |
| 4,645,446 | * | 2/1987 | Hehl ....................................... 425/350 |
| 4,738,863 | * | 4/1988 | Lindgren, Sr. et al. ............. 426/582 |
| 4,802,836 | * | 2/1989 | Whissell ................................ 425/253 |
| 4,850,837 | * | 7/1989 | Lindgren, Sr. et al. ................. 425/84 |

FOREIGN PATENT DOCUMENTS

362091155A * 4/1987 (JP) .
409051770A * 2/1997 (JP) .

* cited by examiner

*Primary Examiner*—George C. Yeung
(74) *Attorney, Agent, or Firm*—Lee, Mann, Smith, McWilliam, Sweeney and Ohlson

(57) ABSTRACT

Apparatus for portioning rice, particularly for sushi, comprises a mould (14) horizontally shiftable between a charging position, in which a row of mould cavities (15) are filled with compressed rice, and a discharge position in which the mould cavities (15) are positioned over a tray (32) to receive the rice portions (11). When the mould (14) is in the discharge position, ejector members (26) move downwardly towards the mould, the ejector members (26) and the mould (14) then moving downwardly together until an over-centre mechanism is released to move the mould (14) upwardly with a snap action which causes the rice portions (11) to be released from the mould cavities (15) and placed in the receiving tray (32).

7 Claims, 6 Drawing Sheets

APPARATUS FOR AND METHOD OF PORTIONING RICE

This invention relates to apparatus for and a method of portioning rice, particularly but not exclusively, for making sushi. This is a transliteration of a Japanese word meaning seasoned rice, but it has in the western world become associated with raw fish because this is a common topping for or accompaniment to the rice.

A known machine for portioning cooked rice (called a Nigiri machine) has a number of rotatably driven wheels which, with gravity assistance, feed the rice downwardly to a pair of cooperating wheels defining a nip into which the rice is delivered. On their outer peripheries, the pair of cooperating wheels are recessed to define a mould cavity into which the rice is first delivered, then compressed as the recessed parts of the wheels move together and finally released under gravity as the recessed parts of the wheels move apart. The rice portions are thus formed and deposited individually. They are then lifted by hand and put into trays where the rice portions are normally topped, for example with fish or meat. This is a slow process the speed of which is limited by the rate of production of the rice portions by the Nigiri machine. The invention aims to provide an apparatus for and method of portioning rice which lends itself to quicker production of the rice portions.

According to a first aspect of the invention there is provided apparatus for portioning rice, comprising a mould having a mould cavity to receive a portion of the rice, filling means for filling the cavity with rice, an ejector member, and means for effecting relative snap-action movement of the mould and the ejector member to cause release of the rice portion from the cavity.

Preferably, the means for effecting relative snap-action movement are operative to cause the mould to move with a snap-action with respect to the ejector member when the latter is in contact with or in close proximity to the rice portion in the cavity, to cause release of the rice portion from the cavity.

The cavity is preferably open at its top and bottom, the ejector member being of a cross-sectional shape complementary to that of the cavity, the mould moving suddenly upwardly relative to the ejector member when said snap action movement takes place.

The apparatus may comprise a chamber for holding a supply of the rice and the filling means may include compressing means for compressing the rice in the chamber, either before the rice is pressed into the mould cavity or at the same time as the rice is pressed into the mould cavity.

The mould is preferably reciprocatable between a charging position in which the mould cavity is aligned with an opening in the chamber to enable the compressing means to push the rice into the mould cavity, and a discharge position in which the mould cavity is aligned with the ejector member, ready for said snap action to take place. In a preferred embodiment, the mould is horizontally reciprocatable, in its discharge position the mould being aligned with a vertical path of movement of the ejector member.

The means for effecting relative movement between the ejector member and the mould preferably comprise an over-centre mechanism which, on release, causes a sudden release of stored energy which applies a step-function force to the mould to move the latter with respect to the ejector member with said snap action. The over-centre mechanism is preferably movable with the mould and engaged by a release member, such as a latch pin, movable with the ejector member.

When in the discharge position, the mould may be movable between a raised position and a lowered position, the ejector member being movable downwardly towards the mould when the latter is in the raised position, the ejector member and the mould then moving downwardly together until the over-centre mechanism is released to cause the mould to return to its raised position with said snap action, preferably under the force of a spring compressed during downward travel of the mould to its lowered position. When in its lowered position, the mould conveniently places the rice portion in a position very close to a receiving tray or the like, so that the snap action causes the rice portion to be released from the mould and immediately placed in the tray.

The cavity may be one of a plurality of cavities disposed side by side in the mould, the ejector member being one of a corresponding plurality of ejector members.

According to a second aspect of the invention there is provide a method of portioning rice, comprising filling a mould cavity in a mould with a portion of rice, effecting relative snap-action movement between the mould and an ejector member, thereby to release the rice portion from the mould cavity.

Rice portion apparatus, and a method of portioning rice, will now be described, by way of example, with reference to the accompanying drawings, in which.

Figure 1:
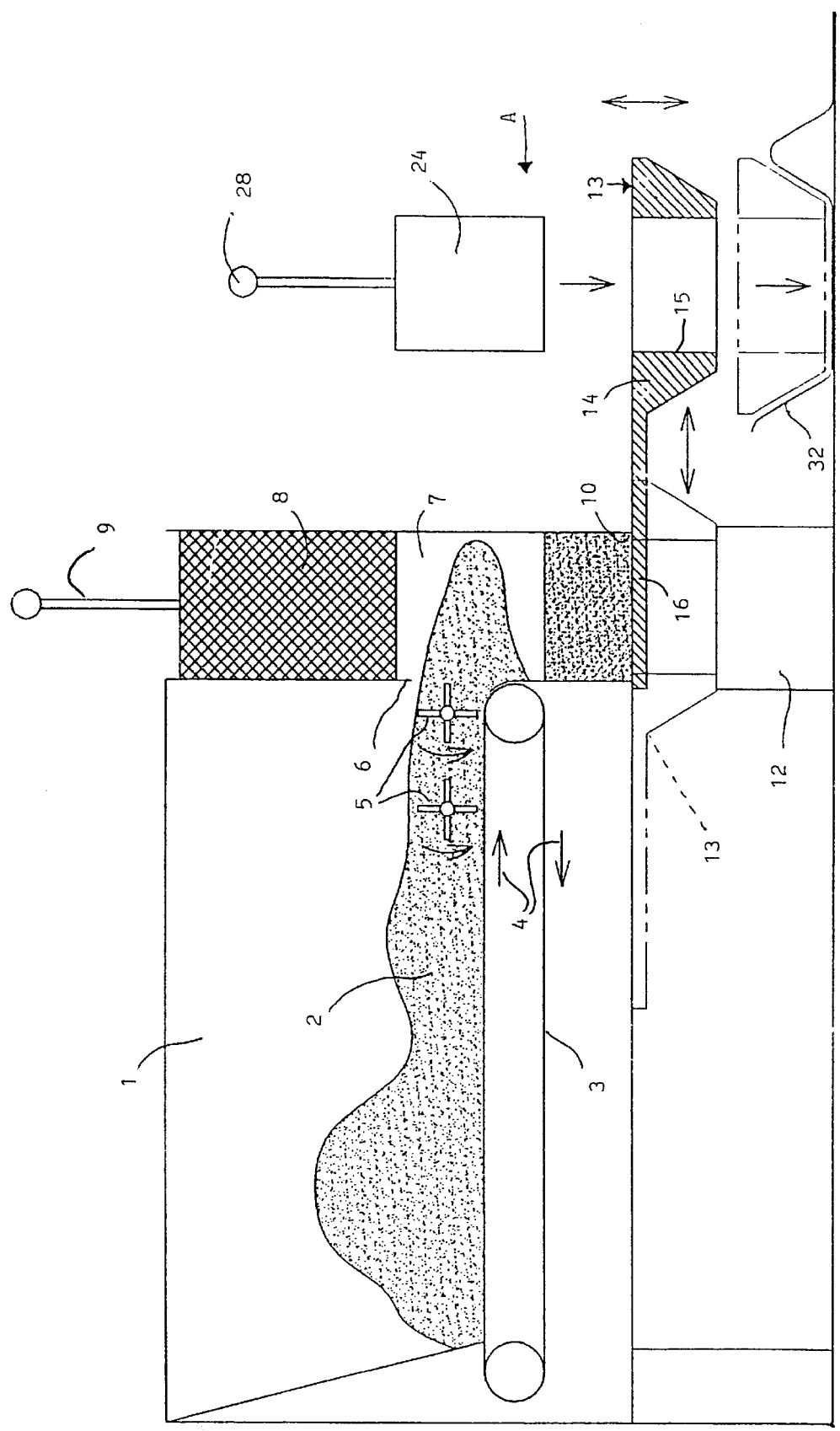
FIG. 1 is a diagrammatic side view of the apparatus.
Figure 2:
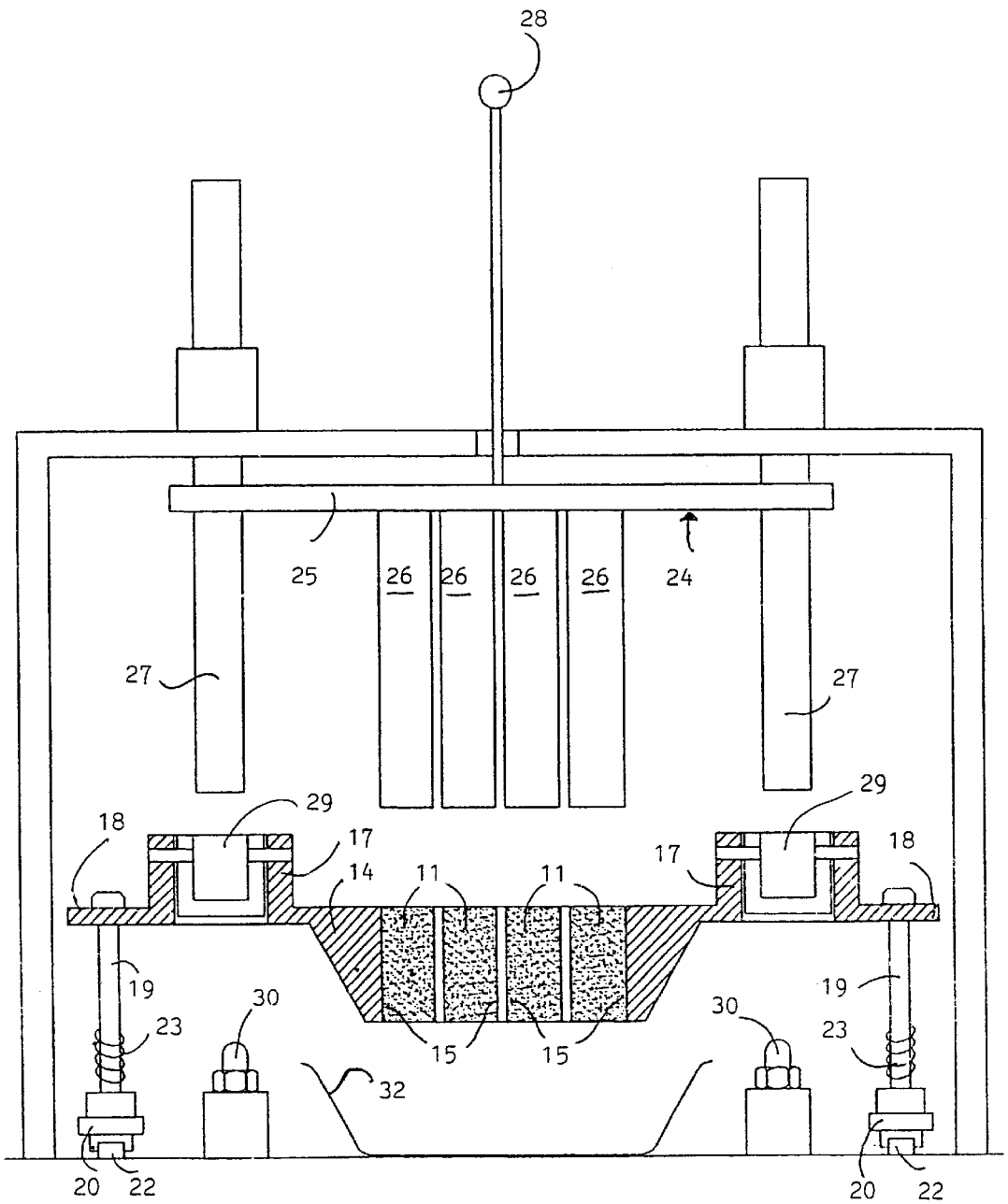
FIG. 2 is an end view of the apparatus looking in the direction of the arrow A in FIG. 1, and FIGS. 3 to 6 are fragmentary side views of part of the apparatus, showing four positions in a cycle of operation.

Referring principally to FIGS. 1 and 2, the apparatus comprises a hopper 1, open at the top, to receive a body of cooked rice 2. In the base of the hopper 1 is a belt conveyor 3 capable of being driven by an electric motor in the direction indicated by the arrows 4. The conveyor 3, together with rotatable paddles 5, acts to feed rice through an outlet aperture 6 in the base of the hopper and into a chamber 7 at one end of the hopper 1. A compression block 8 is vertically slidable (in the manner of a piston) within the chamber 7 under the control of an operating handle 9. The base of the chamber 7 is defined by a downwardly facing opening 10 spaced vertically above a fixed support block 12. A mould assembly 13 is horizontally reciprocable in a longitudinal direction between a discharge position (shown in full lines in FIG. 1), and a charging position (shown in broken lines in FIG. 1). The mould assembly 13 comprises a mould 14 formed with four laterally spaced mould cavities 15 each of which is of cuboid shape and open at the top and bottom of the mould. The mould 14 is attached to or integrally formed with a longitudinally projecting blanking plate 16 and with lateral extensions 17 (FIG. 2) terminating in horizontal support flanges 18. The support flanges 18 are apertured and receive, with a sliding fit, four vertical rods 19, two on each side of the apparatus.

To the base of each rod 19 is attached a linear bearing 20, the two pairs of bearing 20 on each side of the apparatus being guided along a corresponding one of two guide rails 22. Each rod 19 is surrounded by a corresponding helical compression spring 23 the lower end of which abuts the corresponding bearing 20 and the upper end of which abuts the underside of the corresponding flange 18 in oder to bias the mould 14 upwardly.

When the mould assembly 13 is in the discharge position (full lines in FIG. 1) the blanking plate 16 closes the lower opening 10 of the chamber 7 and the four mould cavities 15 are positioned below an ejector assembly 24. When the mould assembly occupies the charging position (broken lines in FIG. 1) the mould cavities 15 are aligned with the opening 10 of the chamber 7, and in this position the lower openings of the mould cavities 15 are closed by the mould support block 12 which underlines the chamber 7.

The ejector assembly 24, best shown FIG. 2, comprises a horizontal plate 25 from which project four vertically depending and laterally spaced ejector members 26 each in the form of a rod of rectangular cross-sectional shape complementary to the shape in plan of the mould cavities 15. The four ejector members 26 are in registration with the four mould cavities 15. The plate 25 also supports two depending latch pins 27. The whole ejector assembly 24 is movable in a vertical direction under the control of a handle 28.

Each lateral extension 17 carries a pivotally mounted and spring-loaded latch member 29 and beneath each latch member is disposed a fixed upwardly projecting stop 30.

The machine operates in the following manner. Cooked rice fed into the hopper 1 is delivered by the conveyor 3 and the paddles 5 into the base of the chamber. With the mould assembly 13 in the charging position, the handle 9 is operated to depress the block 8 and thereby push rice from the chamber 7 into the four mould cavities 15, the undersides of which are closed by the mould support block 12. The rice is thus compressed so as to form portions 11 occupying the whole of each mould cavity 15. When the rice has been thus compressed, it remains in the mould cavities 15 when the mould assembly 13 is shifted on the guide rails 22 to the discharge position shown in full lines in FIG. 1, the cohesiveness of the compressed rice of the portions 11 preventing the latter falling out of the now open undersides of the mould cavities 15.

Figure 3:
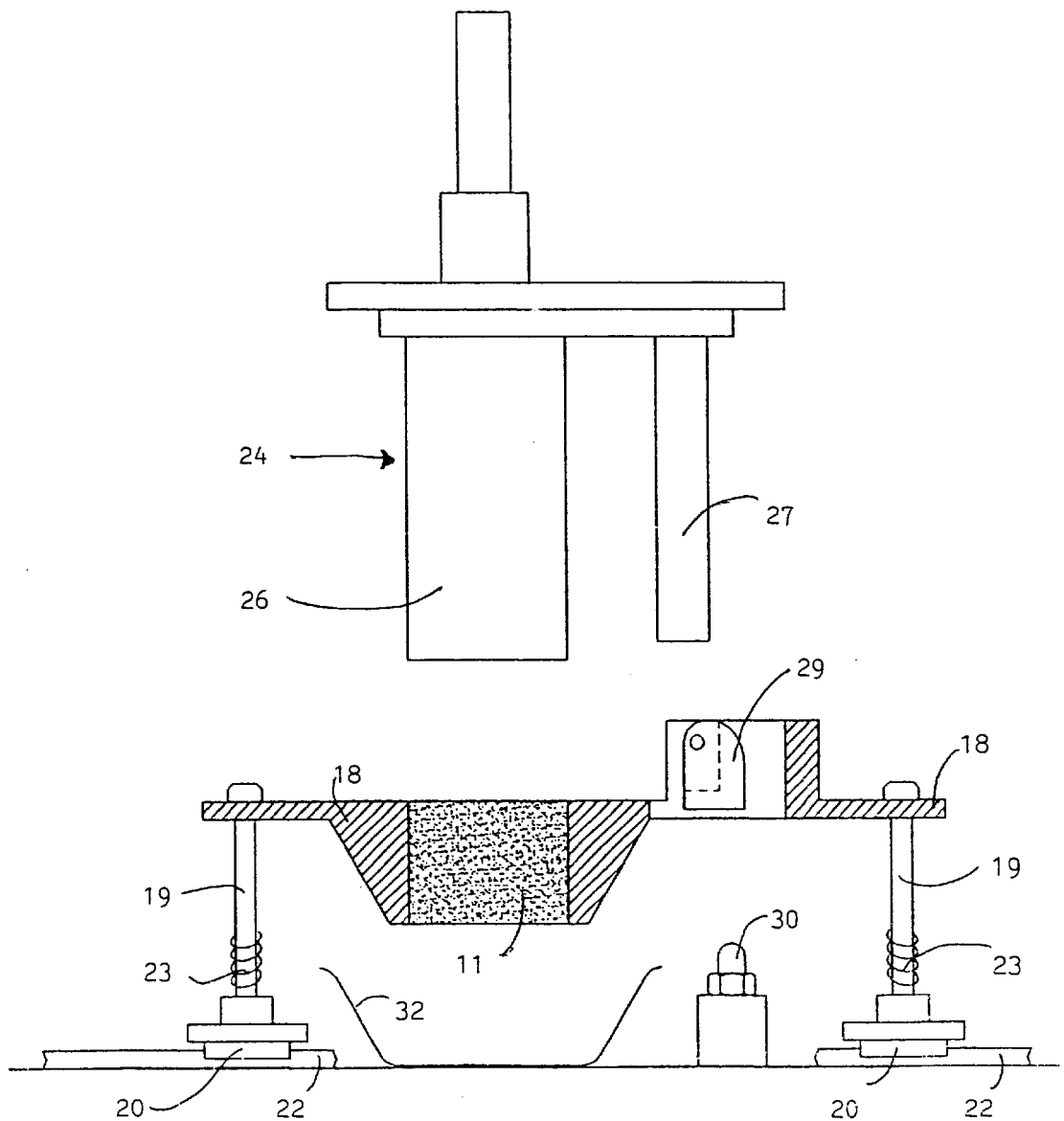

The apparatus is now in the position illustrated in FIG. 3.

Figure 4:
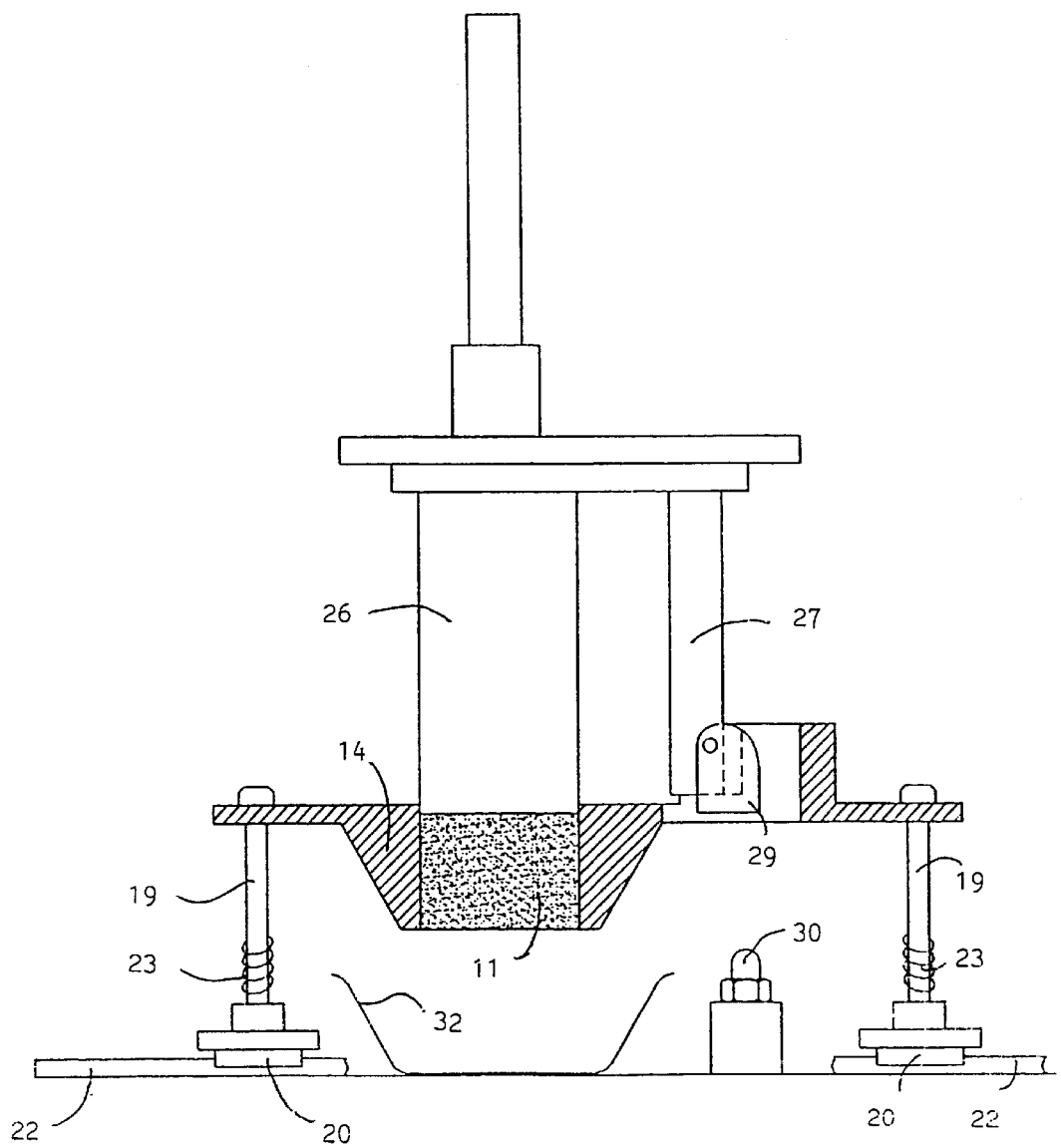

The handle 28 is now used to move the ejector assembly 24 downwardly against a spring bias (not shown). At the moment (FIG. 4) when the undersides of the ejector rods 26 come into close proximity to or light contact with the upper surfaces of the rice portions 11 in the cavities 15, the lower ends of the latch pins 27 engage ledges formed on the respective latch members 29, and continued movement of the handle 28 causes the whole ejector assembly 24 to move downwardly, taking the mould assembly 13 with it. During this movement from its raised position to its lowered position, the mould assembly 13 is guided for vertical movement on the rods 19 and progressively compresses the springs 23.

Figure 5:
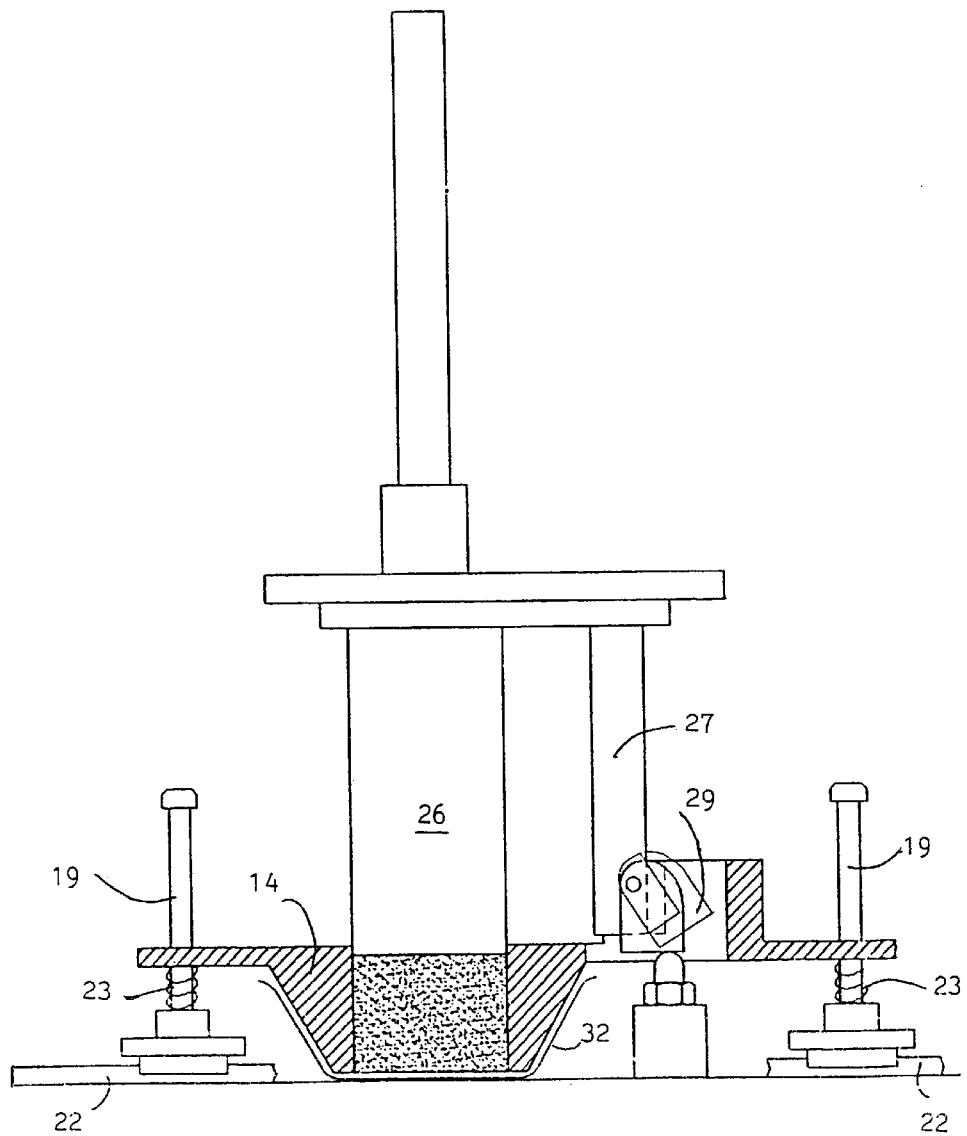
Figure 6:
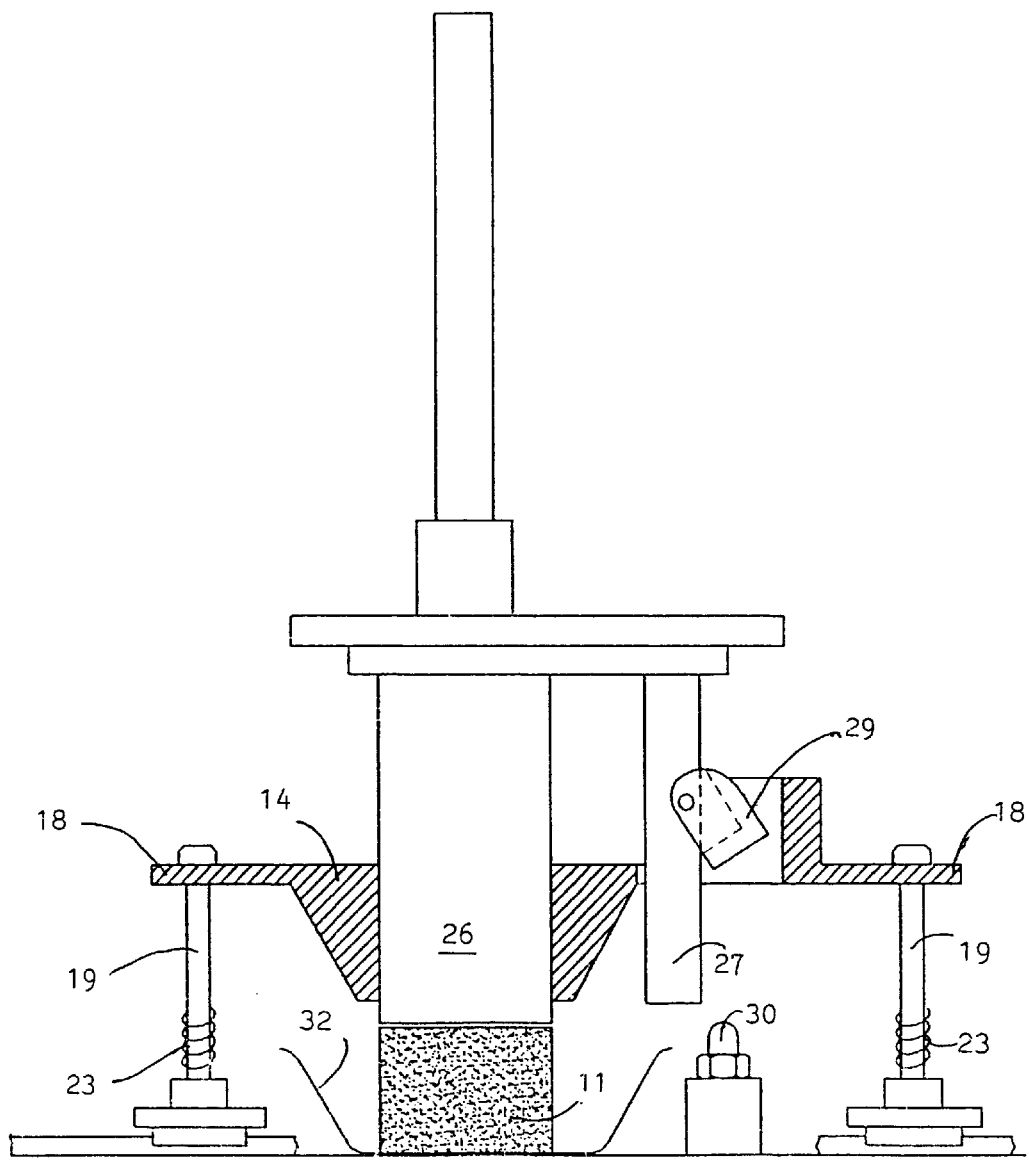

This downward movement of the ejector assembly and the filled mould assembly continues until the undersides of the latch members 29 engage the tops of the stops 30 (FIG. 5), whereupon the latch members move over-centre 29 and pivot (against their spring loading) until they clear the latch pins 27 to release the mould assembly 13 from the downward force applied by the ejector assembly 24. Energy for this snap action is derived from the compressed springs 23. The mould assembly 13 thus moves upwardly (FIG. 6), guided on the rods 19, whilst the ejector members 26 remain in the lowered position. This separates the rice portions 11 from the mould cavities 15 and causes the rice portions 11 to be deposited neatly in the base of a collecting tray 32 which has been placed beneath the mould cavities 15 for this purpose. The downward movement of the ejector assembly 24 together with the mould assembly takes the mould 14 into the recess of the tray 32 so that the lower surfaces of the rice portions 11 are a very small distance above the tray 32. Hence the rice portions 11 have a very short vertical distance to fall into the tray when the snap action release occurs, minimising the chances of the rice portions 11 being damage After this, the handle 28 is raised to cause the ejector assembly 24 to return to its upper position under its spring loading, the latch members 29 then returning to their normal positions ready for the next cycle. The mould assembly 13, now in its raised position, is returned to its charging position beneath the chamber, for the next cycle.

It is important that the rice is pressed into the mould cavities 15 to fill the latter and to cause the rice to coalesce sufficiently to prevent it falling out of the mould cavities 15 when the latter are open. In the machine described this is achieved by the block 8 compressing the body of the rice in the chamber 7 and thereby causing the rice to be pressed into the cavities 15. If required, the rice in the chamber 7 could be pre-compressed in a separate stage whilst the cavities 15 filled in a preceding cycle are being emptied. Also, it will be appreciated that the described machine could be readily automated. For example, cooked rice could be delivered to the hopper 1 at a predetermined rate and trays 32 filled with rice portions could be successively filled at the outlet end of the apparatus.

The snap-action movement of the mould 14 is important because it is this step-function force or impulse which overcomes the frictional engagement of the rice with the mould cavity surfaces, and causes the rice portions 11 to be separated from the mould 14 without breakage of the rice portions 11. The apparatus thus produces four rice portions for each cycle, a large improvement in speed over known machines. It will be appreciated that more than four portions could be produced in each cycle by appropriately increasing the number of mould cavities and the number of ejector rods.

What is claimed is:

1. Apparatus for portioning cooked rice, the apparatus comprising a chamber for holding a supply of the cooked rice, a mould having a mould cavity with an open top and an open bottom, filling means for filling the cavity with cooked rice from the chamber, an ejector member of a cross-sectional shape complementary to that of the cavity, the mould being shiftable horizontally between a charging position in which the mould cavity is aligned with an opening in the chamber to enable the filling means to fill the cavity with a portion of the rice and a discharge position in which the mould cavity is aligned with the ejector member, the mould when in the discharge position also being shiftable vertically between a raised position, and a lowered position, an over-centre mechanism releasable when the mould is in the lowered position in order to apply a step-function force to the mould to move the mould to its raised position with a sudden impulsive movement, to cause the ejector member to penetrate the cavity and effect release of the rice portion from the cavity.

2. Apparatus according to claim 1, wherein the over-centre mechanism comprises a latch member movable with the mould, the latch member engaging a stop at the lowered position of the mould to cause release of the over-centre mechanism.

3. Apparatus according to claim 1, wherein the ejector member is movable downwardly towards the mould when the latter is in the raised position, the ejector member and the mould then moving downwardly together until the over-centre mechanism is released.

4. Apparatus according to claim 1, wherein a spring is compressed during downward travel of the mould to its lowered position, energy stored in the compressed spring providing the step-function force.

5. Apparatus according to claim 1, wherein the mould, when in its lowered position, places the rice portion in a position very close to a receiving tray, so that the impulsive movement causes the rice portion to be released from the mould and immediately placed in the tray.

6. Apparatus according to claim 1, wherein the filling means includes compressing means for compressing the rice in the chamber, either before the rice is pressed into the mould cavity or at the same time as the rice is pressed into the mould cavity.

7. Apparatus according to claim 1, wherein the cavity is one of a plurality of cavities disposed side by side in the mould, the ejector member being one of a corresponding plurality of ejector members, so that the apparatus produces a plurality of portions of cooked rice at each cycle of operation of the apparatus.

\* \* \* \* \*